Patented July 16, 1946

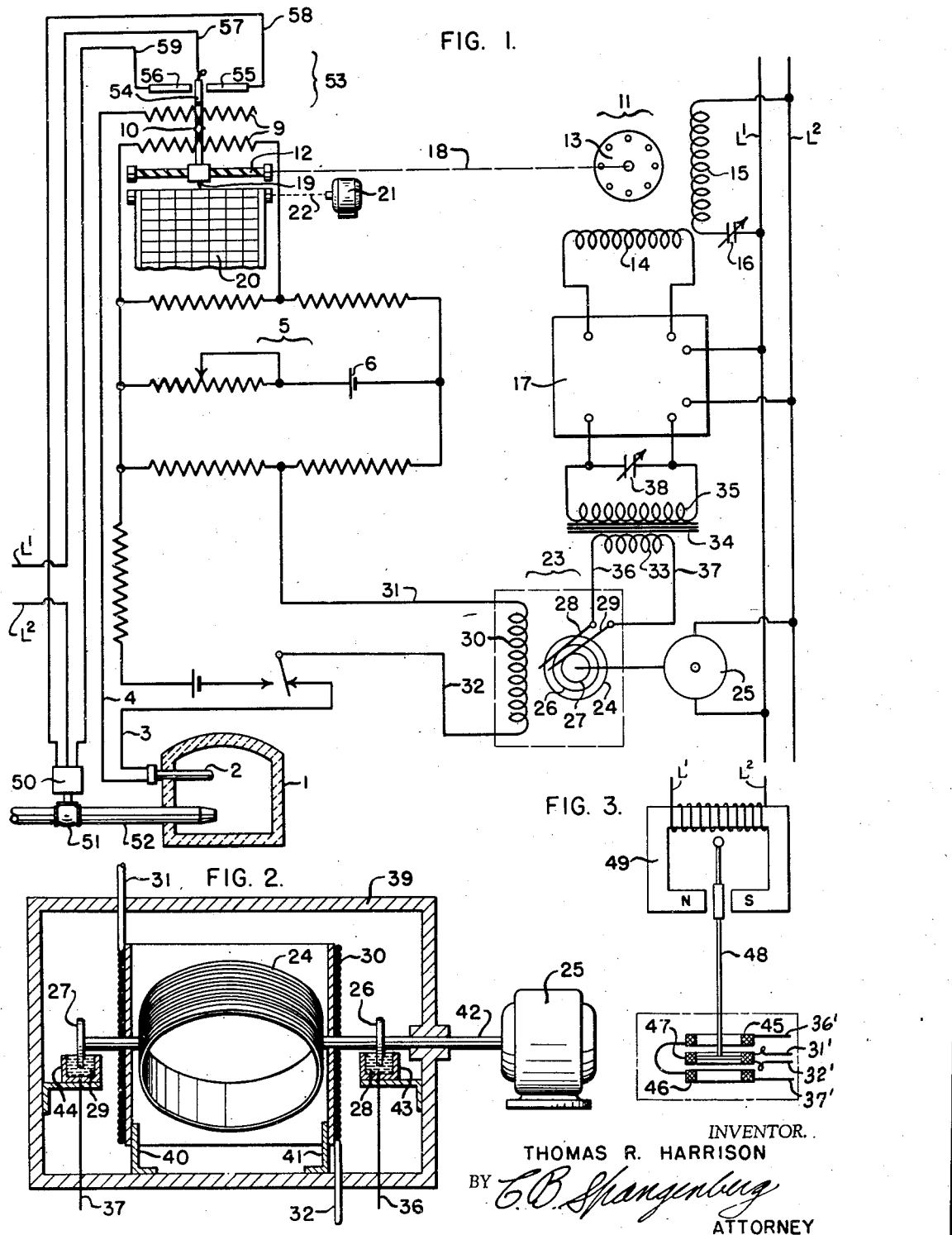

2,404,342

UNITED STATES PATENT OFFICE 2,404,342

MEASURING AND CONTROL APPARATUS

Thomas R. Harrison, Wyncote, Pa., assignor to The Brown Instrument Company, Philadelphia, Pa., a corporation of Pennsylvania Application February 1, 1941, Serial No. 376,972

18 Claims. (Cl. 172—239)

The present invention relates to a method of and apparatus for determining or measuring the magnitude or the departure from a given magnitude, or for maintaining a predetermined magnitude, of a condition, such as a thermal, electrical, mechanical, or chemical, condition. More particularly, the invention relates to systems involving the measurement of and recording of unidirectional electromotive forces of minute magnitude which vary in magnitude in accordance with the variation in magnitude of the condition and their utilization for control purposes.

An object of the invention is to provide a method of measuring and/or recording the variations in magnitude of unidirectional electromotive forces of minute magnitude.

Another object of the invention is to provide a method of utilizing the changes in magnitude of a minute unidirectional electromotive force to control the operation of electromechanical devices.

A more specific object of the invention is to provide indicating, recording and/or controlling apparatus embodying a novel arrangement for producing an alternating electromotive force of one phase or of opposite phase upon deviation of a minute unidirectional electromotive force to be measured from a predetermined value, which alternating electromotive force may be readily amplified to control the operation of rugged electromechanical devices.

Various devices have been utilized in the prior art for measuring the magnitude, or the departure from a given magnitude, of minute unidirectional electromotive forces. One of the most satisfactory of such devices from the standpoint of accuracy and reliability is the so-called potentiometer recorder. In such devices the minute unidirectional electromotive forces are utilized directly to effect deflection of the movable element of a galvanometer or other similar sensitive instrument. This movable element, in turn, is employed to control the operation of motive means such, for example, as mechanical relay mechanism or electromechanical mechanism for rebalancing the potentiometer upon unbalance thereof.

Such prior art devices have certain disadvantages which are avoided by the use of the present invention. In the first place they are relatively expensive since they require the assembly and adjustment of a sensitive galvanometer having a delicate, deflectable element, or similar mechanism. Such galvanometer mechanisms furthermore materially curtail the ruggedness of the instrument as a whole and introduce limitations therein. For example, unless the galvanometer is of the "dead beat" type it tends to oscillate around its ultimate control position. So-called "dead beat" galvanometers on the other hand, require a considerable time interval before completed deflection is obtained, and are, therefore, unsuitable for use in apparatus designed to record rapid variations in a variable condition.

Accordingly, a feature of the present invention is to provide a recorder of the potentiometric and analogous types which is free from the limitations of the galvanometer control type. In carrying out this and other desirable features in one embodiment of the present invention, a magnetic field is produced under control of the unidirectional electromotive force which is to be measured and a coil is rotated by suitable means in said magnetic field to thereby derive an alternating electromotive force of one phase or of opposite phase in the coil depending upon the direction or polarity of the magnetic field, which direction, in turn, is dependent upon the direction of deviation of the unidirectional electromotive force under measurement from a predetermined value. The alternating electromotive force so produced is utilized to control the operation of suitable electromechanical mechanism for rebalancing the recorder.

Specifically, in accordance with this embodiment of the present invention, the minute unidirectional electromotive force to be measured is opposed to a unidirectional electromotive force of known magnitude and the differential therebetween is utilized to produce a magnetic field. When the opposed electromotive forces are equal in magnitude, no magnetic field will be produced because the differential electromotive force then is zero, but upon variation of the unidirectional electromotive force under measurement in one direction or the other, a magnetic field having a corresponding direction is produced. A rotatable coil supported in any suitable manner, and adapted to be rotated by suitable means such as a unidirectional electric motor, is positioned within the magnetic field and is rotated at a constant predetermined speed. Depending upon the direction of the magnetic field and thereby upon the direction of deviation of the unidirectional electromotive force under measurement, an alternating electromotive force of one phase or of opposite phase will be induced in the rotating coil. This alternating electromotive force so induced is capable of being readily amplified and therefore of being utilized to control the operation of electrical mechanism such as a reversible electrical motor to effect rebalance between the opposed unidirectional electromotive forces. The frequency of the alternating electromotive force may be controlled as desired by varying the speed of rotation of the rotatable coil.

In another embodiment of the present invention the unbalanced potentiometric electromotive force is applied to the rotatable coil and a relatively stationary coil is subjected to the influence of the rotatable coil whereby an alternating electromotive force of one phase or of opposite phase, depending upon the polarity of the unbalanced electromotive force, is induced in the stationary coil. With this embodiment of my invention the effect of the earth's magnetic field on the apparatus is eliminated.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a diagrammatic representation of a recording and controlling system embodying the principles of my invention;

Fig. 2 is a detail view in cross section of a portion of the arrangement of Fig. 1;

Fig. 3 illustrates an alternative arrangement which may be utilized in the system of Fig. 1 in lieu of the arrangement shown in Fig. 2.

Figure 4:
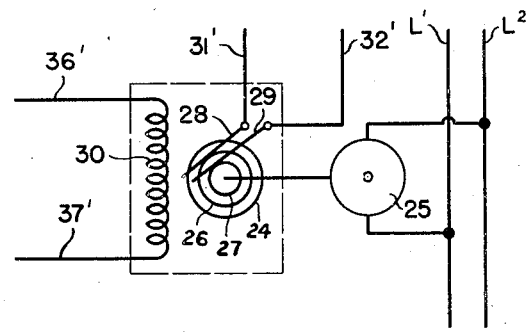
Figs. 4 and 5 illustrate alternative connections of the devices of Figs. 2 and 3, respectively, to the system of Fig. 1.

In the drawings an arrangement is illustrated for recording the variations in temperature in the interior of a furnace 1 in which a thermocouple 2 responsive to slight changes of temperature is arranged in heat transfer relation. The thermocouple 2 is connected by conductors 3 and 4 to the terminals of a self balancing potentiometric network indicated generally by the reference numeral 5, which network may be of any suitable type such as the Brown potentiometric network disclosed in my prior Patent 1,898,124 issued February 21, 1933. The potentiometric network 5 is of a well known type and therefore it is sufficient for the present purposes to note that it includes a circuit branch including the thermocouple 2 and an opposing circuit branch including a source of known potential such as a battery 6 and resistors 9, a variable portion of which may be connected into the opposed branches by means of a sliding contact 10 whereby the respective effects of the variable and known sources may be made equal and opposite. The potentiometric network is thus balanced for a given value of electromotive force developed by the thermocouple 2 with the contact 10 in a corresponding position along the resistors 9. The position of the contact 10 is then a measure of the value of the thermocouple electromotive force and may serve as a measure of the temperature to which the thermocouple is exposed.

In the embodiment illustrated in the drawings, the contact 10 is adjusted back and forth along resistors 9 in response to unbalance of the potentiometric network 5 by means including a reversible electrical motor 11, the rotation and direction of rotation of which is adapted to be selectively controlled by means to be described in response to potentiometric unbalance. Motor 11 is connected in any convenient manner to contact 10 for adjusting the latter along resistors 9 and thereby effects rebalance of the potentiometric network 5 in response to a change in the electromotive force developed by the thermocouple 2. Specifically, the shaft of motor 11 is connected to a screw shaft 12 and is adapted to adjust a carriage, on which the contact 10 is mounted, in one direction or the other along the length thereof as shaft 12 is rotated.

The reversible electrical motor 11 is of the induction type and includes a squirrel cage rotor 13 and two pairs of oppositely displaced field poles (not shown) on which windings 14 and 15 are wound. Winding 14 is wound on one pair of said field poles and winding 15 is wound on the other pair of field poles. Winding 15 is connected in series with a condenser 16 to the alternating current supply conductors $L^1$ and $L^2$. Due to the action of condenser 16 the current which flows through the winding 15 will lead the line voltage by approximately 90°.

The means by which the rotation and the direction of rotation of the reversible motor 11 is selectively controlled in accordance with the state of balance of the potentiometric network 5 includes an electronic amplifier 17 to the input circuit of which an alternating electromotive force of one phase or of opposite phase is adapted to be impressed upon unbalance of the potentiometric network 5 in one direction or the other and to the output circuit of which the motor winding 14 is connected. The electronic amplifier 17 may be of any well known type and is connected to and receives energizing current from the alternating current supply lines $L^1$ and $L^2$. The alternating current supplied motor winding 14 by the electronic amplifier 17 is substantially in phase, or 180° out of phase, with the voltage of the supply lines $L^1$ and $L^2$ and establishes a field in the motor which is displaced 90° in one direction or the other with respect to that established therein by the winding 15. The reaction between the field set up by winding 14 and that set up by winding 15 establishes a rotating field in the motor which rotates in one direction or the other depending upon the direction of displacement of the fields and thus upon the direction of unbalance of the potentiometric network 5. The motor rotor is connected by suitable gearing or coupling indicated by the dotted line 18 to the screw threaded shaft 12 so that the contact 10 is adjusted along the slidewire resistors 9 in accordance with the direction of rotation of the motor. The direction and duration of rotation of the motor is controlled in response to unbalance of the potentiometric network so that the contact 10 is adjusted in the proper direction the precise amount to reduce the potentiometric unbalance to zero.

If desired, a pen 19 may be mounted on the carriage which carries the potentiometer slidewire contact 10 and arranged in cooperative relation with a chart 20 to thereby provide a continuous record of the temperature of the interior of the furnace 1. The chart 20 may be a strip chart as shown, and is adapted to be driven in any convenient manner, as for example, by a unidirectional electrical motor 21 through gearing indicated at 22 so that a record of the temperature to which the thermocouple is subjected will be recorded as a continuous line on the chart. It will be apparent that the slidewire resistances 9 may be mounted on a circular form, if desired, and that a circular chart may then be utilized for recording purposes in lieu of the strip chart 20.

The means referred to hereinbefore for translating the unidirectional unbalanced potentiometric currents into an alternating current of one phase or of opposite phase depending upon the direction of potentiometric unbalance comprises an electromechanical device indicated generally by the reference numeral 23. The electromechanical device 23 embodies the principles of the electrical generator or dynamo and includes an armature winding, indicated generally by the reference numeral 24, which is rotated at a predetermined constant speed by a unidirectional electrical motor 25 and the terminals of which are connected through slip rings 26 and 27 to collector brushes 28 and 29, respectively. The electromechanical device 23 also includes a relatively stationary field winding 30 on which the unbalanced electromotive forces produced in the potentiometric network 5 are applied by conductors 31 and 32.

The motor 25 is energized from the alternating current supply conductors $L^1$ and $L^2$ and rotates the armature 24 in the magnetic field produced by the stationary field winding 30 at the proper speed to induce an alternating current in the armature 24 of one phase or of opposite phase depending upon the direction of the said magnetic field and of the same frequency as that of the supply lines $L^1$ and $L^2$. The armature 24 is connected by conductors 36 and 37 and by means of the slip rings 26, 27 and the brushes 28, 29 in series with the primary winding 33 of a transformer 34. The transformer 34 includes a secondary winding 35 which is connected to the input terminals of the electronic amplifier 17.

When the potentiometric network is in a balanced condition, the current flow through the stationary field winding 30 of the electromechanical device 23 is substantially zero, and accordingly, the magnetic field established by the latter will also be substantially zero. While this condition exists, no magnetic lines of flux will be cut by the armature during the rotation of the latter and accordingly no electromotive force will be induced in the armature 24. Upon unbalance of the potentiometric network 5 in one direction or the other, however, a current will flow in one direction or the other through the winding 30, accordingly, to establish a magnetic field through the armature in one direction or the other. Rotation of the armature 24 in this magnetic field operates to induce an alternating electromotive force of one phase or of opposite phase in the armature depending upon the direction of the magnetic field, which electromotive force is amplified by the transformer 34 and the amplifier 17 and the amplified quantity is utilized to selectively energize the reversible electrical motor 11 for rotation in a corresponding direction. A tuning condenser 38 is desirably connected across the terminals of the secondary winding 35 of the transfer 34 for adjusting the phase position of the alternating electromotive force impressed on the motor winding 14 by the amplifier 17 and for varying the wave shape of that electromotive force.

In Figs. 2 and 3 I have illustrated in detail two alternative forms of the electromechanical device 23 shown schematically in Fig. 1. As seen in Fig. 2 the armature winding 24 is of the air core type and is positioned within the field winding 30 which is also of the air core type. Both of the windings 24 and 30 are located within a container 39 of magnetic material in order to shield the said windings from the earth's magnetic field and also from stray magnetic fields to which the apparatus may be subjected. The field winding 30 is supported within the container 39 by brackets 40 and 41 which are mounted on the bottom of the container. The armature winding 24 is supported for rotation within the field winding 30 by the shaft 42 of motor 25 and is rigid with said shaft. In Fig. 2 the brushes 28, 29 comprise wells 43 and 44 each of which contain mercury and in which the rings 26 and 27 dip, respectively. The rings 26 and 27 are rigidly supported by shaft 42, but are insulated therefrom. Ring 26 is connected to one end of the armature winding 24 and ring 27 is connected to the other end of this winding. The mercury wells 43 and 44 are supported by the container 39 in any convenient manner. Conductors 36 and 37 which are employed to connect the armature winding 24 to the transformer primary winding 33 are connected to the wells 43 and 44 so as to make electrical contact with the mercury within the wells.

I contemplate two modes of operation of the apparatus so far described. In accordance with one mode of operation it is contemplated to apply the unbalanced currents produced in the potentiometric network 5 to the stationary winding 30 of the electromechanical device 23 and to connect the armature winding 24 to the terminals of the transformer primary winding 33. In accordance with the second mode of operation contemplated, the unbalanced currents produced in the potentiometric network 5 are applied to the armature winding 24 and the stationary winding 30 is connected in series with the transformer primary winding 33 as is illustrated, more or less diagrammatically, in Fig. 4. By applying the unbalanced potentiometer currents to the armature winding 24 the effect of the earth's magnetic field on the apparatus is avoided.

Figure 5:
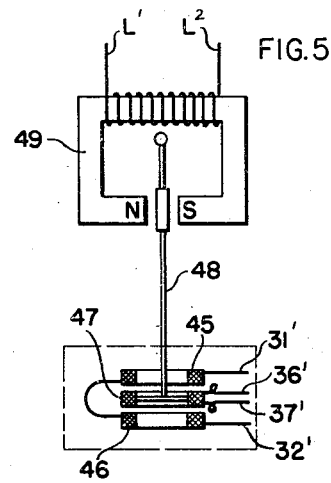

The arrangement illustrated in Fig. 3 for transforming the unbalanced potentiometer currents into an alternating current of one phase or of opposite phase comprises two stationary pancake coils 45, 46 between which a movable pancake coil 47 is arranged to oscillate or reciprocate in a plane perpendicular to the axes of the coils 45 and 46. Coil 47 is disposed on one end of a reed 48 which is rigidly supported at its other end and is oscillated by an electromagnet 49 which is energized from the supply conductors $L^1$ and $L^2$. The electromagnet 49 is desirably polarized so that the frequency of oscillation of the coil 47 between the coils 45 and 46 is the same as the frequency of the alternating current supplied by the conductors $L^1$ and $L^2$. In this embodiment of my invention it is contemplated that the unbalanced potentiometer currents may be applied to the coil 47 and the coils 45 and 46 may be connected in series with the primary winding 33 of the transformer 34. Alternatively, the unbalanced potentiometer currents may be applied to the terminals of the pancake coils 45 and 46 connected in series and the coil 47 may be connected in series with the transformer primary winding 33 as is illustrated in Fig. 5.

This form of my invention is desirable over the form shown in Fig. 2 in that the leads from the pancake coils may be brought out as flexible "pigtails" which are permanently connected to the coils thus obviating any sliding contacts or connections made through mercury or any other means. The pancake coils 45, 46 and 47 in this embodiment of my invention, like that shown in Fig. 2, may be enclosed within a magnetic container to minimize the effects of stray magnetic fields on the operation of the instrument.

It will be apparent that the supply of heating agent to the furnace 1 may be controlled in accordance with the deflection of the recording pen 19 along the chart 20. For example, a reversible electrical motor 50 having two opposed field windings (not shown) may be utilized to adjust a fuel valve 51 disposed in the pipe 52 which supplies fuel to the furnace. To this end the reversible motor 50 is energized for rotation in one direction or the other depending upon the direction of deflection of the pen 19 from a predetermined position along the chart 20, which position corresponds to the temperature it is desired to maintain in the furnace 1. Specifically a switch 53 which is actuated in accordance with the adjustments of the recording pen is provided for controlling the energization of the motor 50. The switch 53 comprises a switch arm 54, which is insulated from but is carried by the same support which carries the pen 19 and the potentiometer slidewire contact 10, and also two elongated contact segments 55 and 56 which are disposed on opposite sides of the arm 54. The arm 54 is connected by a conductor 57 to the alternating current supply conductor $L^1$. The contact segment 55 is connected by a conductor 58 in which one winding of the motor 50 is inserted to the alternating current supply conductor $L^2$ and the contact segment 56 is connected by a conductor 59 in which the other winding of the motor 50 is inserted to the supply conductor $L^2$.

With the arrangement described, when the arm 54 is intermediate the contact segments 55 and 56, the motor 50 is not energized for rotation in either direction, but when the arm 54 is in engagement with the contact segment 55, the motor is energized for rotation in the direction to open the fuel valve 51 and thereby to increase the supply of fuel to the furnace 1. When the arm 54 is in engagement with the contact segment 56, the motor 50 is energized for rotation in the opposite direction and effects a closing adjustment of the valve 51 and thereby a decrease in the supply of fuel to the furnace.

Although not shown, the contact segments 55 and 56 of the switch 53 are desirably made adjustable relatively to each other and to the chart 20 so that both the sensitivity and the control setting of the apparatus may be adjusted in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The method of measuring the magnitude of a unidirectional electromotive force which comprises the steps of opposing said unidirectional electromotive force to a source of known electromotive force to derive a differential electromotive force, applying said differential electromotive force to an inductive element to produce a magnetic field having one direction or the other depending upon the polarity of said differential electromotive force, relatively moving said magnetic field and an electrical conductor to induce an alternating electromotive force of regular frequency in said conductor, amplifying said induced alternating electromotive force, and applying said amplified electromotive force to effect a balance between said opposed electromotive forces.

2. The method of measuring the magnitude of a unidirectional electromotive force which comprises the steps of opposing said unidirectional electromotive force to a source of known electromotive force to derive a differential electromotive force, applying said differential electromotive force to one winding of a dynamo having at least two relatively movable windings, oscillating said dynamo windings relatively to each other to induce an alternating electromotive force of regular frequency in the other winding of said dynamo, and utilizing said fluctuating electromotive force to effect a balance between said opposed electromotive forces.

3. The method of measuring the magnitude of a unidirectional electromotive force which comprises the steps of opposing said unidirectional electromotive force to a source of known electromotive force to derive a differential electromotive force, applying said differential electromotive force to one winding of a dynamo having another winding, relatively oscillating said windings to induce an alternating electromotive force of regular frequency in said other winding, and utilizing said fluctuating electromotive force to effect a balance between said opposed electromotive forces.

4. The method of measuring the magnitude of a unidirectional electromotive force which comprises the steps of opposing said unidirectional electromotive force to a source of known electromotive force to derive a differential electromotive force, applying said differential electromotive force to one winding of a dynamo also having a relatively stationary winding, oscillating said first mentioned winding relatively to said stationary winding to induce a fluctuating electromotive force in said stationary winding, and utilizing said fluctuating electromotive force to effect a balance between said opposed electromotive forces.

5. In measuring apparatus, the combination of a potentiometer resistance, means for applying a known electromotive force and an unknown electromotive force to said resistance in opposing relation to derive a differential unidirectional electromotive force, means to produce a magnetic field in one direction or the other depending upon the polarity of said differential electromotive force, an electrical conductor, means to relatively move said magnetic field and said electrical conductor to induce an alternating electromotive force of regular frequency in said conductor and of one phase or of opposite phase depending upon the direction of said magnetic field, means to amplify said induced alternating electromotive force, and phase responsive means energized by said amplified alternating electromotive force to effect a balance between said opposed electromotive forces.

6. The combination of claim 5 wherein said phase responsive means comprises a reversible electrical motor having a winding which is energized by said amplified alternating electromotive force and a winding which is energized from a source of alternating current.

7. In measuring apparatus the combination of a potentiometer resistance, means for applying a known electromotive force and an unknown electromotive force to said resistance in opposing relation to derive a differential unidirectional electromotive force, means to produce a magnetic field in one direction or the other depending upon the polarity of said differential electromotive force, a winding, means to relatively oscillate said winding and said magnetic field to induce an alternating electromotive force of regular frequency in said winding, and means controlled by said induced alternating electromotive force to effect a balance between said opposed electromotive forces.

8. In measuring apparatus the combination of a potentiometer resistance, means for applying a known electromotive force and an unknown electromotive force to said resistance in opposing relation to derive a resultant unidirectional electromotive forces, a pair of relatively movable windings, means to apply said differential electromotive force to one of said windings to produce a magnetic field in one direction or the other depending upon the polarity of said differential electromotive forces, means to relatively oscillate said windings to induce an alternating electromotive force of regular frequency in said other winding, and means controlled by said induced alternating electromotive force to effect a balance between said opposed electromotive forces.

9. In measuring apparatus the combination of a potentiometer resistance, means for applying a known electromotive force and an unknown electromotive force to said resistance in opposing relation to derive a differential unidirectional electromotive force, a pair of relatively movable windings, means to apply said differential electromotive force to one of said windings to produce a magnetic field in one direction or the other depending upon the polarity of said differential electromotive force, means to oscillate said one winding relatively to said other winding to induce an alternating electromotive force of regular frequency in said other winding, and means controlled by said induced alternating electromotive force to effect a balance between said opposed electromotive forces.

10. Apparatus for detecting the polarity of an unknown direct current, comprising a field coil through which said direct current passes, a pick-up coil, vibrating means varying the inductive relation of said field coil with said pick-up coil, and means comparing the phase of the alternating current generated in the pick-up coil with the phase of motion of the vibration means.

11. Apparatus for detecting the polarity of an unknown direct current, comprising a field coil through which said direct current passes, a pick-up coil, a vibrating element varying the inductive relation of said field coil with said pick-up coil, means amplifying the alternating current voltage generated in said pick-up coil, and means combining the magnetic field produced by said amplified alternating current voltage with a magnetic field synchronized with the vibration of said vibrating element, said last named means being responsive to phase reversal of said amplified alternating current voltage.

12. Apparatus for controlling a condition associated with the flow of direct current in an electric circuit, comprising a coil in said electric circuit, a second coil, a vibrating element varying the inductive relation of said coil with said second coil, means amplifying the alternating current voltage induced in said second coil, and means combining the magnetic field produced by said amplified alternating current with a magnetic field synchronized with said vibrating element, said last named means being responsive to phase reversal of said amplified alternating current to control said condition.

13. The method of balancing a direct electromotive force of unknown magnitude which comprises opposing said electromotive force by a second electromotive force, passing the current produced by the resultant electromotive force through a coil, periodically varying the inductive relation of said coil with a second coil, amplifying the voltage produced in said second coil and employing the phase of said amplified voltage to adjust one of said electromotive forces.

14. Apparatus for automatically balancing an electrical network, comprising an alternator having a field, a synchronous motor driving said alternator, means for applying unbalanced direct current voltage from said network to said field of said alternator, means for amplifying the output of said alternator, means for reducing said unbalanced direct current voltage, and means for actuating said last means in response to said amplified output and the voltage supplying said synchronous motor.

15. In an electrical network requiring the balancing of direct current voltages, an alternator connected with said network, means for energizing the field of said alternator in response to voltage unbalance in said network, means driving said alternator, an amplifier connected to the output of said alternator, and means connected to the output of said amplifier for balancing said direct current voltages.

16. In an electrical network requiring the balancing of direct current voltages, an alternator connected with said network, means for energizing the field of said alternator in response to direct current voltage unbalance in said network, a synchronous motor driving said alternator, and means operated jointly by the output of said alternator and the voltage supply to said synchronous motor to balance said direct current voltages.

17. In an electrical network requiring the balancing of direct current voltages, means varying the inductive relation between a coil carrying a steady unbalanced direct current and a second coil, means amplifying the alternating current induced in said second coil, and means actuated by said amplified alternating current for automatically reducing said unbalanced direct current voltage.

18. In measuring apparatus, the combination of a potentiometer resistance, means for applying a known electromotive force and an unknown electromotive force to said resistance in opposing relation to derive a differential unidirectional electromotive force, at least two relatively rotatable devices, a container enclosing said devices and magnetically shielding them from external magnetic fields, said devices being operative when relatively rotated to derive from said differential electromotive force a fluctuating electromotive force of one phase or of opposite phase depending upon the polarity of said differential electromotive force, a shaft extending through the container to relatively rotate said devices, motive means to rotate said shaft, and phase sensitive means responsive to the phase of said derived electromotive force to effect a balance between said opposed electromotive forces.

THOMAS R. HARRISON.